United States Patent

[11] 3,608,981

| [72] | Inventors | Shigetomo Yui<br>Katsuta-shi;<br>Tetsuji Hirotsu, Katsuta-shi; Hisao Sonobe,<br>Ibaragi-ken, all of Japan |
|---|---|---|
| [21] | Appl. No. | 808,093 |
| [22] | Filed | Mar. 18, 1969 |
| [45] | Patented | Sept. 28, 1971 |
| [73] | Assignee | Hitachi, Ltd.<br>Tokyo-to, Japan |
| [32] | Priority | Mar. 22, 1968, Oct. 28, 1968, July 24,<br>1968, Nov. 29, 1968 |
| [33] | | Japan |
| [31] | | 43/18211, 43/77927, 43/62834 and<br>43/103619 |

[54] RE-ADHESION APPARATUS FOR VEHICLES
25 Claims, 15 Drawing Figs.

[52] U.S. Cl. .................................................. 303/21 BE,
303/20
[51] Int. Cl. .................................................. B60t 8/08
[50] Field of Search ............................................ 303/20, 21
BE

[56] References Cited
UNITED STATES PATENTS

| 3,503,654 | 3/1970 | Stamm | 303/21 |
| 3,022,114 | 2/1962 | Sampietro | 303/21 |
| 3,260,555 | 7/1966 | Packer | 303/21 (BB) |
| 3,288,232 | 11/1966 | Shepherd | 303/21 (BB) X |
| 3,362,757 | 1/1968 | Marcheron | 303/21 (A4) |
| 3,398,995 | 8/1968 | Martin | 303/21 (A4) |

Primary Examiner—Duane A. Reger
Attorney—Craig, Antonelli and Hill

ABSTRACT: A re-adhesion apparatus for vehicles, including means adapted to detect together a change in the velocity of a nonadhesion axle with respect to the velocity of an adhesion axle and a differential of such change whereby nonadhesion phenomena in a vehicle can very early be detected in accordance with an output which is obtained when the detected values exceed preset levels.

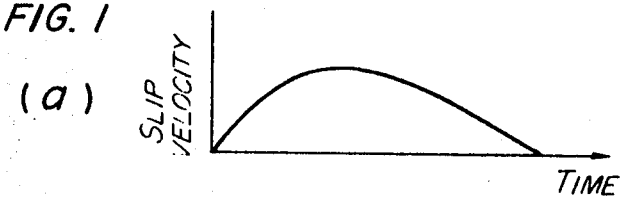
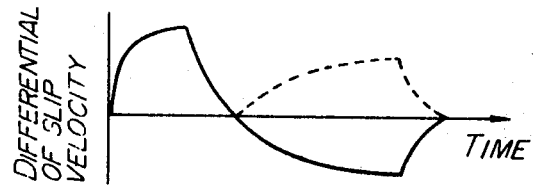
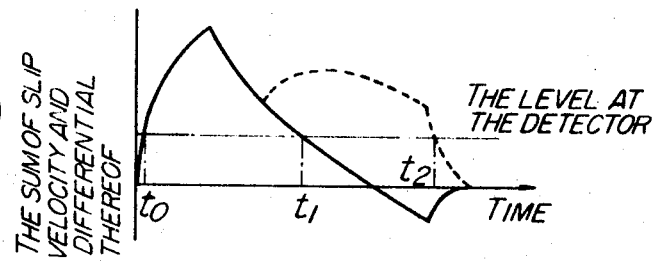
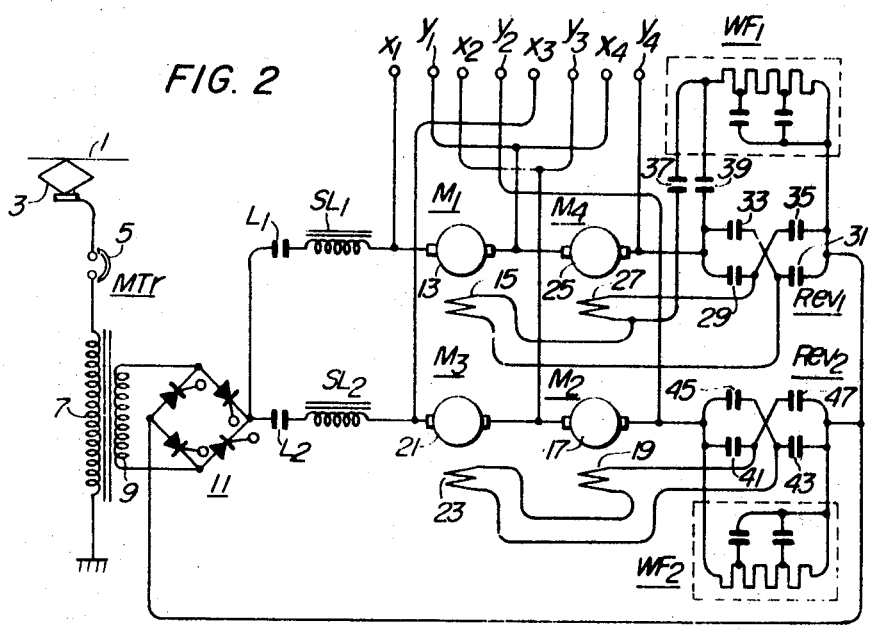

RE-ADHESION APPARATUS FOR VEHICLES

BACKGROUND OF THE INVENTION

1. Field of the Invention

This invention relates to a re-adhesion apparatus for vehicles.

2. Description of the Prior Art

Nonadhesion phenomena such as slipping, skidding, etc. are extremely undesirable since not only the tractive effort or braking force of the vehicle tends to be substantially lost but also the wheels, rails, etc. tend to be damaged. Therefore, these phenomena must be restrained as effectively as possible, and once such phenomena have occurred, it is essential that necessary means be taken to early detect and restrain them before they lead to heavy slipping or skidding.

In the conventional means for detecting the aforementioned phenomena, it is usual practice to compare the velocity of optional two-wheel axles. Such conventional means is provided with a dead band in which it does not respond to any deviation resulting from the difference in characteristics between the axle velocity detecting means such for example as tachogenerator difference in diameter between the wheels associated with the respective axles, etc.

With the conventional means just described, therefore, it is impossible to detect slipping or skidding which has occurred with respect to two axles to be compared. Thus, it often happens that there occurs heavy slipping or skidding.

Furthermore, delay in the detection is more or less caused due to the presence of the aforementioned dead band, even in the case where slipping or skidding has occurred with respect to one of the axles. This makes it difficult to achieve early detection of such phenomena.

SUMMARY OF THE INVENTION

It is an object of the present invention to provide a re-adhesion apparatus for vehicles with a high adhesion property, wherein a change in the velocity of a nonadhesion axle with respect to the velocity of an adhesion axle and a differential of such change are detected together, thus ensuring that nonadhesion phenomena are detected early.

Another object of the present invention is to provide a re-adhesion apparatus for vehicles, which is simplified to such an extent that the requirements for control can be sufficiently met and the capability of achieving early detection of nonadhesion phenomena is not lost.

A further object of the present invention is to provide a re-adhesion apparatus for vehicles, which is adapted to be used in combination with a quick-response brake means and/or the like so as to substantially effectively achieve early detection of nonadhesion phenomena.

Other objects will become apparent from the description concerning the preferred embodiments of the present invention taken in conjunction with the accompanying drawings.

The present invention is characterized in that a change in the velocity of a nonadhesion axle with respect to the velocity of an adhesion axle and a differential of such change are detected together, thus achieving the detection of nonadhesion phenomena in accordance with an output which is obtained when the detected values exceed preset levels.

Furthermore, the present invention is characterized by the preferred embodiments shown in the drawings, including means adapted to represent relaying characteristics upon arrival of an input at a preset level when the said change is detected, said means being simplified by suitably selecting the input.

BRIEF DESCRIPTION OF THE DRAWINGS

FIGS. 1(a)-1(c) are views illustrating the principles of the nonadhesion phenomena detecting operation constituting an important part of the re-adhesion apparatus according to the present invention;

FIG. 2 is a view showing a typical main circuit connection of an AC electric locomotive, useful for explaining an example of applications of the re-adhesion apparatus according to the present invention;

DETAILED DESCRIPTION OF THE PREFERRED EMBODIMENTS

Figure 3:
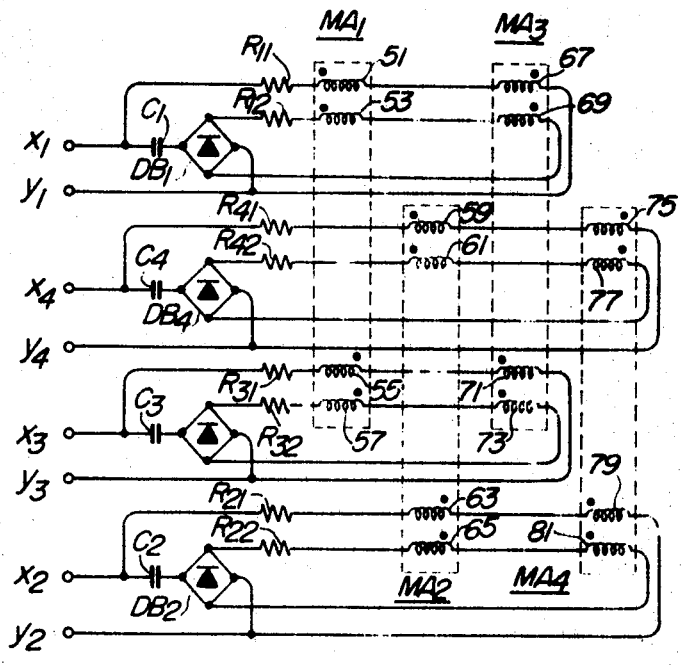
FIG. 3 is a view showing a part of the re-adhesion apparatus according to a first embodiment of the present invention.

As is well known in the art, the nonadhesion phenomenon of rolling stock occurs when a tractive effort or braking force exceeds the limit of adhesion which depends upon the coefficient of adhesion between the wheels and the rails, and the axle weight. Thus, a slip is caused when a tractive effort in excess of the limit of adhesion is imparted to the vehicle during the acceleration of the vehicle, while a skid is caused when a braking force in excess of the limit of adhesion is applied to the vehicle during the deceleration of the vehicle.

In the case of an electric locomotive, the aforementioned two phenomena appear as variations in the armature voltage of a main electric motor for example. More specifically, the armature voltage of a main motor which is driving a slipping axle becomes higher than that of a main motor which is driving an adhesion axle. In the case of a skid, this relationship is reversed. That is, as viewed with respect to the velocity of the respective wheel axles, there occurs a relative velocity (deviation) between nonadhesion axle and the adhesion axle. Such deviation in velocity assumes different values, positive or negative, depending upon whether the nonadhesion phenomenon is a slip or a skid. Thus, by making use of the difference between the velocity of the nonadhesion axle and that of the adhesion axle, a voltage proportional only to the slip or skid velocity can easily be obtained.

With other than an electric rolling stock, it is possible to obtain a voltage depending only upon the slip or skid velocity, by comparing output voltages of tachogenerators associated with the respective axles.

In either case, therefore, the two types of nonadhesion phenomena can be detected by a similar method and means. In the following discussion, description will be made mainly of a slip phenomenon. As to a skid phenomenon, points in which it differs from a slip phenomenon will be mentioned as occasion demands.

FIGS. 1(a)-1(c) illustrate a slip phenomenon, wherein (a) shows variations with time of the slip velocity, (b) shows the differential of the slip velocity (a), and (c) shows the sum of the slip velocity and differential thereof shown at (a) and (b) respectively.

Generally, in the case of a slip, the coefficient of adhesion between a wheel and a rail decreases upon occurrence of the slip, and the tractive effort at the periphery of the driving wheels also decreases with an increase in slip velocity, as will be seen from FIG. 1(a). At a point where the tractive effort goes below the limit of adhesion, the increase of slip velocity is ceased so that a velocity balance is obtained. If the vehicle is accelerated by the tractive effort of any other adhesion axle, then the slip velocity begins decreasing, and finally re-adhesion occurs.

It depends upon the conditions of a slip whether a slip continues while assuming the aforementioned balanced slip velocity or it is subjected to re-adhesion. However, there is no possibility that a slip occurs with respect to all the driving axles. Simultaneous slip occurs with respect to at most one or two axles. Generally, therefore, it may well be considered that re-adhesion is caused as shown in FIG. 1(a), since tractive efforts are provided by the remaining axles. It is to be noted however that the period of time between the point of time when a slip occurs and the point of time when re-adhesion occurs depends solely upon the conditions at the particular time. Needless to say, it is desirable to reduce this period of time.

By differentiating the slip velocity which varies as shown in FIG. 1(a), such a result as shown by the solid line in FIG. 1(b) is obtained. As will be seen from the FIG. 1(b) the differentiated waveform is characterized by a sharp buildup. Thus, in an attempt to detect the occurrence of a slip, this can be quickly achieved by detecting the differential of the slip velocity, that is, the acceleration of the slip. This means that the slip can be detected during the time when the slip velocity is still low, and therefore, effective measures can be taken at an early stage of the slip.

In the case of a slip in which its velocity increases gradually, however, the differential of the slip velocity is very low. In such case, it is impossible to detect the slip merely by virtue of such differential, and therefore there is a possibility that a heavy slip occurs before effective measures are taken thereagainst. In the case of such a slip, therefore, it is necessary to detect the slip velocity per se.

This can be achieved most easily and effectively by detecting the sum of the slip velocity and the differential thereof such as shown by the solid line in FIG. 1(c).

As shown by the solid line in FIG. 1(b), the differential of the slip velocity changes both positively and negatively. Therefore, more effective detection can be achieved by adding the absolute value of the differential to the slip velocity. The reason is this. The dotted lines in FIGS. 1(b) and 1(c) show the cases where the absolute value is utilized respectively. On the assumption that the operating level of the detector is as shown by the alternate long and short dash line in FIG. 1(c), the output when the absolute value is not resorted to appears between a point of time $t_0$ and a point of time $t_1$, while in the case where the absolute value is employed, the period of time during which the output appears is extended up to a point of time $t_2$ so that the effective control range can be expanded up to a point where re-adhesion occurs.

Description will now be made of the preferred embodiments of the present invention which are based on the aforementioned principles of operation.

FIG. 2 is a connection diagram of the main circuit of an electric rolling stock including four main electric motors, to which the below-mentioned embodiment of the present invention is applied. In this case, it is assumed that four driving axles are driven by these main electric motors, and that these axles are designated as the first, second, third and fourth axles as viewed from the direction opposite to the running direction of the vehicle. Further, the first and second axles are accommodated in a common signal truck, and the third and fourth axles in another common single truck. The former truck is referred to as the first truck, and the latter as the second truck.

Description will first be made of the arrangement of the main circuit.

In FIG. 2, an electric contact wire 1 is connected with a suitable AC power source. A pantagraph 3 is adapted to slide along the contact wire 1 so that a primary winding 7 of a main transformer MTr is energized. A circuit breaker 5 is interposed between the main transformer MTr and the pantagraph 3.

The main transformer MTr includes a secondary winding 9 the output of which energizes a converter means 11 consisting of thyristors. This converter means 11 is adapted to act as a power rectifier for converting an AC voltage to a variable DC voltage by phase-control at the powering while in the case of regenerative braking, it serves as power inverter for converting a DC voltage to an AC voltage.

The output of the converter means 11 during powering energizes the main electric motor circuit which will be described later. In the case of a vehicle in which regenerative braking is not effected, however, the converter means is not required to perform the inverting operation. In such case, various modified forms of converter means may be employed.

Among such modifications to the converter means are means wherein the output of a main transformer adapted to provide an AC variable voltage with the aid of a multiplicity of taps is rectified by an ordinary rectifier, a well-known bridge circuit having two arms thereof consitituted by thyristors and the remaining two arms formed by diodes, and so forth.

The main electric motor circuit is constituted by two substantially symmetrical parallel circuits. These two circuits are connected with the positive output terminal of the converter means 11 through line breakers $L_1$ and $L_2$ respectively. Inserted in these circuits are smoothing reactors $SL_1$ and $SL_2$ adapted for smoothing a current respectively.

The main electric motors $M_1$, $M_2$, $M_3$ and $M_4$ are DC series-winding motors which include armatures 13, 17, 21 and 25 and corresponding field winding 15, 19, 23 and 27 which are adapted to drive the aforementioned first to fourth axles respectively. The suffixes of $M_1$, $M_2$, $M_3$, and $M_4$ indicate the positions of the axles.

Generally, when starting an electric vehicle, unbalance in axle weight occurs among the axles or transfer of axle weight occurs, as is well known in the art. This is due to the fact that in the case of a four-axle vehicle such as described above, transfer of load is first caused between the two trucks and then transmitted between the wheel axles accommodated in each truck. More specifically, the load applied to the first truck becomes less than that imparted to the second truck. In the respective trucks the load applied to the first axle becomes less than that imparted to the second axle and the load applied to the third axle becomes less than that imparted to the fourth axle.

Thus, the fourth axle has the highest adhesion property, and the first axle is the most susceptible to a slip. The second and third axles are under substantially the same adhesion condition. In such state, in order to achieve the starting without slip, it is required that the tractive effort imparted to the electric vehicle be made lower than the value to which it is limited by the first axle. Hence, the overall tractive effort to be applied to the vehicle is greatly restricted.

For the above reason, in the main electric motor for each axle means for compensating for such transfer of axle weight as to produce a torque corresponding to the weight of each axle is adopted, in addition to mechanical transfer of axle weight preventing means applied to the vehicle body and/or trucks.

The main electric motor circuit arrangement shown in FIG. 2 includes an example of such additional means. As will be seen from this FIG., the armatures 13 and 25 are connected in series with each other, and the field winding 15 and 27 connected in series with each other are connected with the armature circuit just described through a reversing device $Rev_1$.

In case the contactors 29 and 31 of the reversing device $Rev_1$ are closed and a contactor 37 is closed, then a weak field controller $WF_1$ is connected in parallel with the field winding 15 so that the field produced in the main electric motor $M_1$ can be weakened in accordance with the weight of the first axle. When the running direction is reversed, that is, when the contactors 33 and 35 of the reversing device $Rev_1$ are open, the weak field controller $WF_1$ is now connected in parallel with the field winding 27.

The contactor 39 is closed in an attempt to equally weaken the fields produced in the main electric motors $M_1$ and $M_4$. In this case, the contactor 37 is opened.

In the main electric motors $M_2$ and $M_3$, too, a similar connection is established. In this case, however, a weak field controller $WF_2$ is connected in parallel with a reversing device $Rev_2$ since the second and third axles represent the same adhesion property. Thus, equal currents are caused to flow through the field windings 19 and 23, whether the contactors 41 and 43 or 45 and 47 are closed.

With the foregoing arrangement, the output torque of each of the main electric motors can be controlled in accordance with the amount of transfer of axle weight at the starting point.

Each of the weak field controllers $WF_1$ and $WF_2$ is constituted by a plurality of resistors and a contactor adapted to sequentially short circuit the resistors, but it is also possible that current controlling means using thyristors or the like may be employed instead.

The reversing devices $Rev_1$ and $Rev_2$ are connected with each other at the negative sides, and coupled to the negative terminal of the converter means 11.

Although, in the foregoing, description has been made of the case where the present invention is applied to a typical example of AC electric rolling stocks it is to be understood that the present invention is by no means limited to such application. As will become readily apparent to those skilled in the art, the present invention can also equally be applied to DC electric rolling stock or rolling stock driven by any other engine.

In an electric vehicle having the foregoing main circuit arrangement, the "forward" main circuit is established by closing the contactors 29, 31 and 41, 43 of the reversing devices $Rev_1$ $Rev_2$ for example and closing the line breakers $L_1$ and $L_2$.

By phase-controlling the converter means 11 in the aforementioned state, a voltage is applied to the main electric motors $M_1$, $M_2$, $M_3$ and $M_4$, so that the electric vehicle is driven.

As the speed of the electric vehicle increases, the counter electromotive forces of the armature 13, 17, 21 and 25 also increase, each of which is substantially proportional to the speed, as is well known in the art.

In order to maintain the armature currents at a constant value or increase them by overcoming the increasing counter electromotive forces, it is necessary to further advance the phase of the converter means 11 thereby to increase the voltage applied to the main electric motors. Thus, the speed of the electric vehicle is balanced at a point where the counter electromotive force of each main electric motor becomes equal to the voltage applied thereto. In order to attain a higher speed than that which can be attained with the control range for the phase-control, it is essential that the field weakening control achieved by the weak field controllers $WF_1$ and $WF_2$ be resorted to.

During the process that the electric vehicle continues normal running, the aforementioned counter electromotive forces remain substantially equal to each other, so that substantially equal voltages appear at terminals $x_1$-$y_1$, $x_2$-$y_2$, $x_3$-$y_3$ and $x_4$-$y_4$ for detecting the armature voltages of the respective main electric motors. Strictly speaking, however, there the tendency exists that the voltages appearing at these terminals more or less differ from each other depending upon the difference in characteristics between the respective main electric motors and difference in diameter between the wheels which are driven by these main electric motors.

In the present example, a slip is detected by making use of the voltages appearing at the terminals $x_1$-$y_1$, $x_2$-$y_2$, $x_3$-$y_3$ and $x_4$-$y_4$.

Figure 4:
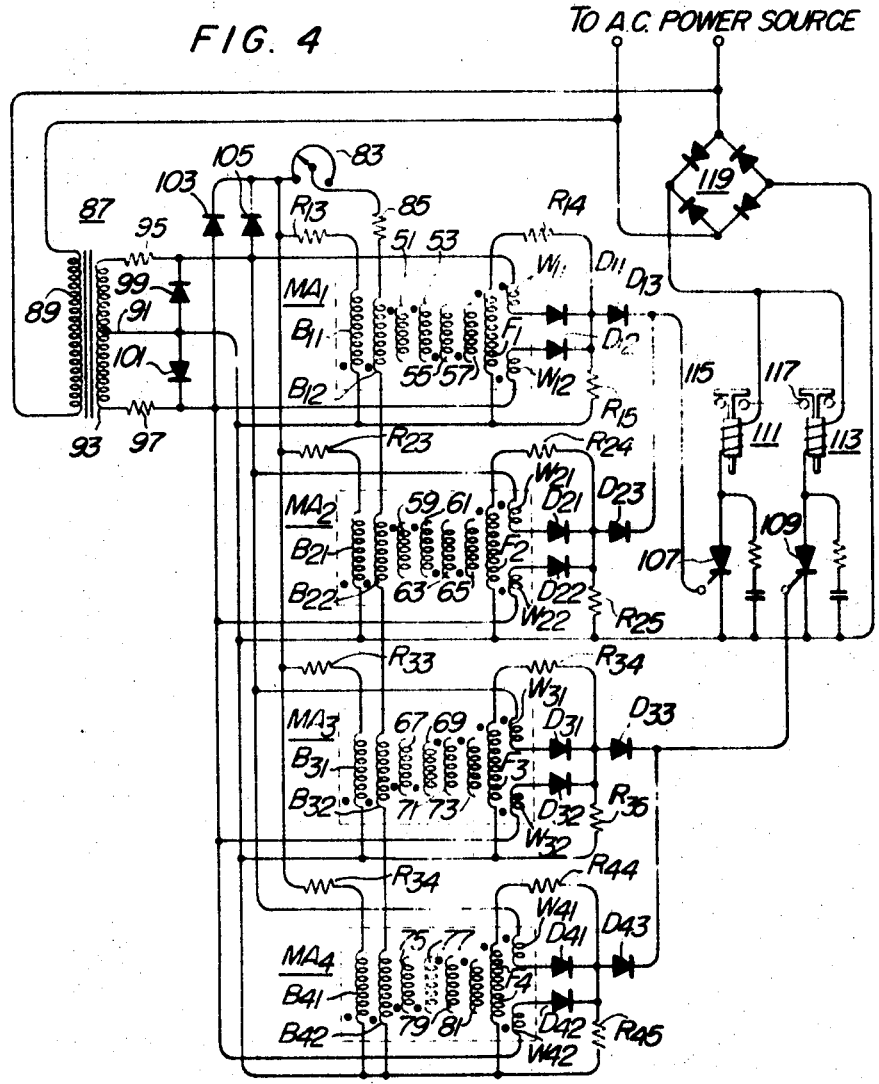
FIG. 4 is a view showing the remaining part of said first embodiment which constitutes the apparatus according to the first embodiment together with the part shown in FIG. 3.

Referring to FIGS. 3 and 4, description will be made of concrete example of the slip detecting means.

Each of magnetic amplifiers $MA_1$, $MA_2$, $MA_3$ and $MA_4$ includes four control input winding. As will be seen from FIGS. 3 and 4, the control input windings 51, 53 and 55, 57 of the magnetic amplifier $MA_1$ for example are wound in opposite polarity to each other respectively as indicated by marks ".".

Further, the control input windings 67, 69 and 71, 73 of the magnetic amplifier $MA_3$ are connected in series and in reverse polarity with the control input windings 51, 53 and 55, 57 of the magnetic amplifiers $MA_1$ respectively.

The connection between the control input terminals 59, 61 and 63, 65 of the magnetic amplifier $MA_2$ and the control input windings 75, 77 and 79, 81 of the magnetic amplifiers $MA_4$ is similar to that between the control input windings of the aforementioned two magnetic amplifiers.

The control input windings of these magnetic amplifiers are energized by the following input circuit.

The voltages appearing at the terminals shown in FIG. 2 are applied to the terminals $x_1$-$y_1$, $x_2$-$y_2$, $x_3$-$y_3$ and $X_4$-$y_4$ respectively, and thence to the control input windings 51 and 67, 59 and 75, 55 and 71, and 63 and 79 through resistors $R_{11}$, $R_{41}$, $R_{21}$ respectively.

Then, these voltages are differentiated by capacitors $C_1$, $C_4$, $C_3$ and $C_2$, subsequently rectified by diode bridges $DB_1$, $DB_4$, $DB_3$ and $DB_2$ respectively, and supplied to the control input windings 53 and 69, 61 and 77, 57 and 74, and 65 and 81 through resistors $R_{12}$, $R_{42}$, $R_{32}$ and $R_{22}$ respectively.

The operation of the magnetic amplifier $MA_1$ will now be considered. The armature voltages of the main electric motors $M_1$ and $M_3$ are applied to the terminals $x_1$-$y_1$ and $x_3$-$y_3$ respectively. Due to the fact that control input windings 51, 53 and 55, 57 are connected in reverse polarity with each other, the magnetic amplifier $MA_1$ is energized in accordance with the difference between the armature voltages of the main electric motors $M_1$ and $M_3$ and the difference between the differentials thereof. That is, it is energized in accordance with the voltage difference between the armatures 13 and 21 and the differential thereof.

The magnetic amplifier $MA_3$ is also energized in accordance with the difference between the armature voltages of the main electric motors $M_1$ and $M_3$ and the differential thereof, but the direction of energization is opposite to that in the case of the magnetic amplifier $MA_1$, as will be seen from the foregoing description and drawings.

As will be also readily appreciated, the magnetic amplifiers $MA_2$ and $MA_4$ are energized in the opposite direction to each other in accordance with the difference between the armature voltages of the main electric motors $M_2$ and $M_4$ and the differential thereof.

These magnetic amplifiers are provided with bias windings $B_{11}$, $B_{21}$, $B_{31}$ and $B_{41}$ for individually adjusting the characteristics thereof, respectively, and are energized in such a manner as to be controlled with the aid of resistors $R_{13}$, $R_{23}$, $R_{33}$ and $R_{43}$ respectively. Furthermore, they are provided with bias windings $B_{12}$, $B_{22}$, $B_{32}$ and $B_{42}$ for adjusting the overall detection sensitivity respectively, which are connected in series with each other and energized through adjusting variable resistor 83 and current limiting resistor 85.

Feedback windings $F_1$, $F_2$, $f_3$ and $F_4$ are energized through the resistors $R_{14}$, $R_{24}$, $R_{34}$ and $R_{44}$ respectively so as to impart proper positive feedback to the respective magnetic amplifiers to provide the latter with jumping characteristics such as those of a relay device.

The outputs of the output windings $W_{11}$ and $W_{12}$ are rectified by diodes $D_{11}$ and $D_{12}$ respectively. Similarly, the outputs of output windings $W_{21}$, $W_{22}$, $W_{31}$, $W_{32}$, $W_{41}$ and $W_{42}$ are rectified by diodes $D_{21}$, $D_{22}$, $D_{31}$, $D_{32}$, $D_{41}$ and $D_{42}$ respectively. Resistors $R_{15}$, $R_{25}$, $R_{25}$ and $R_{45}$ serve as loads for the aforementioned output windings respectively.

Diodes $D_{13}$, $D_{23}$, $D_{33}$ and $D_{43}$ are provided for the purpose of preventing the formation of local circuits in the parallel connected magnetic amplifiers $MA_1$ and $MA_2$, $MA_3$ and $MA_4$ respectively.

A transformer 87 for energizing these magnetic amplifiers comprises a primary winding 89 energized by an AC power source and a secondary winding 93 provided with a center tap 91. Constant-voltage diodes 99 and 101 are connected between the opposite ends of the secondary winding 93 and the center tap 91 through resistors 95 and 97 respectively.

Thus, AC voltages of trapezoidal waveform are obtained between the cathodes of the constant-voltage diodes 99 and 101 and the center tap, and they are utilized as power sources for all the magnetic amplifiers.

The aforementioned voltages of trapezoidal waveform are full wave-rectified by diodes 103 and 105 so as to serve as bias source.

Furthermore, the outputs of the magnetic amplifiers $MA_1$ and $MA_2$ are connected with each other, and the outputs of the magnetic amplifiers $MA_3$ and $MA_4$ are connected with each other. The former and latter outputs are connected with the gate electrodes of thyristors 107 and 109 respectively. Thus, when the magnetic amplifier $MA_1$ or $MA_2$ provides an output, the thyristor 107 is ignited, and when the magnetic amplifier $MA_3$ or $MA_4$ provides an output, the thyristor 109 is ignited.

When the thyristor 107 or 109 is ignited so as to be rendered conductive, a slip relay 111 or 113 is energized so that contacts 115 or 117 are made, respectively. A diode bridge 119 is provided for the purpose of rectifying the AC power source to provide a power source for energizing the slip relays 111 and 113.

Let it be assumed that a slip occurs with respect to the first axle driven by the main electric motor $M_1$ for example when the electric vehicle shown in FIG. 2 is started by turning on the line breakers $L_1$ and $L_2$ to initiate the phase-control of the converter means 11.

Then, all the other axles are subjected to adhesion, so that the armature voltage of the main electric motor $M_1$ is the highest while the armature voltage of the main electric motor $M_4$ is the lowest. The armature voltages of the main electric motors $M_2$ and $M_3$ assume the normal value.

The reason is that since the voltage applied to the series circuit of the two main electric motors is maintained equal to the output voltage of the converter means 11, the armature current of the main electric motor $M_1$ decreases with an increase in the armature voltage thereof so that the armature voltage of the main electric motor $M_4$ decreases.

The magnetic amplifier $MA_1$ is energized in accordance with the difference between the armature voltages of the main electric motors $M_1$ and $M_3$ since these armature voltages are applied as inputs to the magnetic amplifier $MA_1$.

This voltage difference corresponds to the difference between a voltage proportional to the velocity of the slipping axle and that proportional to the velocity of the axle subjected to adhesion, and therefore it is equal to a voltage proportional only to the slip velocity.

Further, the respective armature voltages are differentiated by the capacitors $C_1$ and $C_3$, and then rectified by the diode bridges $DB_1$ and $DB_3$ so that the control input windings 53 and 57 are energized thereby.

Thus, the magnetic amplifier $MA_1$ is energized by a voltage proportional to the slip velocity and a voltage corresponding to the differential thereof, so that the control input flux therein is caused to enter the positive region with an increase in slip velocity.

The magnetic amplifier $MA_3$ is energized by the same input voltage as that applied to the magnetic amplifier $MA_1$. However, since the control input windings 67, 69 and 71, 73 are connected in reverse polarity with the control input windings 51, 53 and 55, 57 respectively, the control input flux is direct in the direction opposite to that of the magnetic amplifier $MA_1$ so that the control input of the magnetic amplifier $MA_3$ is greatly energized in the negative region.

Since all the magnetic amplifiers are provided with high positive feedback by the feedback windings $F_1$, $F_2$, $F_3$ and $F_4$, such output characteristics that sharp buildup occurs with respect to the positive region of a control input are achieved. Thus, one of the two magnetic amplifiers or $MA_1$ produces an output while the other one or $MA_3$ does not produce any output.

The armature voltage of the main electric motor $M_4$ is lower than that of the main electric motor $M_2$, so that the control inputs to both the magnetic amplifiers $MA_2$ and $MA_4$ are driven into the negative region. Therefore, no output is provided by any of these magnetic amplifiers.

The output of the magnetic amplifier $MA_1$ persists during the time when the main electric motor $M_1$ continues slipping. Similarly, if the main electric motor $M_2$, $M_3$ or $M_4$ is caused to slip, then there is available an output from the corresponding magnetic amplifier $MA_2$, $MA_3$ or $MA_4$.

Each magnetic amplifier is adapted to represent a slight dead band also with respect to the positive region of a control input thereto. This is in order to make none of the magnetic amplifiers responsive to the unbalance between the respective armature voltages which results from the differences in characteristics between the respective main electric motors and the differences in diameter between the wheels driven by these motors.

To this end, the extent of energization with respect to the bias windings $B_{11}$, $B_{21}$, $B_{31}$ and $B_{41}$ is adjusted by selecting suitable values for the resistors $R_{13}$, $R_{23}$, $R_{33}$ and $R_{43}$.

In the foregoing description has been made of the case where the armature voltages of the main electric motors are detected as control inputs to the respective magnetic amplifiers. However, it is also possible that the present invention may be applied to applications in which use is made of the output voltage of a tachogenerator associated with each axle. It is to be noted that the versatility of the present invention is by no means lost whatever control input may be used.

Furthermore, although here above, description has been made of the case where the magnetic amplifiers are used as means each adapted to compare the armature voltages and provide an output when the voltage deviation goes beyond a preset level, such means are by no means limited to magnetic amplifiers. Instead of the aforementioned means, use may be made of the conventional means such as comparator means adapted to compare a plurality of inputs, means adapted to represent the so-called relay characteristics to provide an output upon arrival of an input thereto at a preset level, or the like.

The outputs of the aforementioned magnetic amplifiers are supplied to all the means for restraining the slip, as slip detection signals. For example, the outputs may be used as signals to stop the advancement of the control angle of the phase-control by the converter means 11 until a slipping axle is subjected to re-adhesion or return the control angle to the low value. These means correspond to the notch stop or notch return in the notching a DC electric vehicle wherein main resistors connected in series with the main electric motors are sequentially short-circuited.

Needless to say, the aforementioned slip detection signal may be used also as signal for such hatch stop or notch return.

A general method of restraining a slip is to use means for applying an airbrake to a slipping axle. Such method can be applied not only to electric vehicles but also to vehicles which are driven by any other engine.

Description will now be made of the case where the slip detection signal provided by the aforementioned arrangement is used to impart air brake to the slipping axle.

Figure 5:
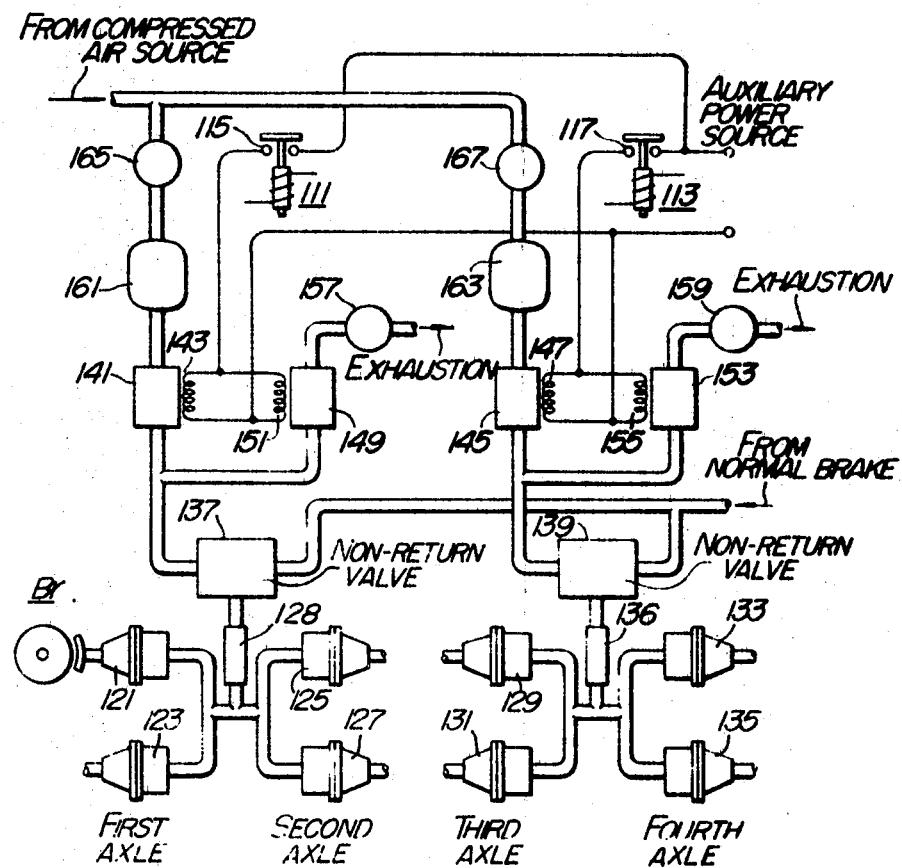
FIG. 5 is a view showing airbrake means, useful for explaining a mode of utilization of the aforementioned embodiment.

FIG. 5 shows only that portion of an airbrake system which is employed for the purpose of restraining a slip. This device is so constructed as to be applicable to the aforementioned quick-response device.

Referring to FIG 5, there are shown two airbrake systems adapted for restraining a slip associated with respective trucks so as to be applicable to an electric vehicle having four driving axles each two of which are accommodated in a single truck.

As shown in the drawing, brake cylinders 121, 123, 125 and 127 are associated with the first truck. The brake cylinders 121 and 123 are adapted to impart braking forces to the two wheels mounted on the first axle, and the other brake cylinders 125 and 127 are adapted to apply braking forces to the two wheels mounted on the second axle. Further, brake cylinders 129, 131 and 133, 135 are associated with the second truck and are adapted to impart braking forces to the third and fourth axles respectively.

Pipes for supplying compressed air to these brake cylinders are connected with each other in each truck and coupled to the components installed on the vehicle body through flexible tubes such as strong rubber tubes, which are adapted to absorb vibrations and relative motion of the trucks to the vehicle body which tend to be caused during the running of the vehicle.

Supplied to the four brake cylinders associated with each truck is compressed air through compound nonreturn valves 137 and 139 which are adapted to be actuated in accordance with the difference between two air pressure inputs so as to provide only the higher air pressure as output. In this case, as one of the inputs to each of the compound nonreturn valves 137 and 139, controlled compressed air from normal, or ordinary airbrake means is provided.

The other one of the inputs to each of the compound nonreturn valves 137 and 139 is available from the slip restraining systems each of which is constructed as follows.

Such systems include electromagnetic valves 141 and 145 for passing compressed air to the respective brake cylinders and electromagnetic valves 149 and 153 adapted to exhaust the compressed air in the cylinders so as to relieve the braking forces. These electromagnetic valves are controlled in respect of opening and closure by means of electromagnetic coils 143, 147, 151 and 155 associated therewith respectively.

The electromagnetic coils 143 and 147 of the electromagnetic valves 141, 145 and the electromagnetic coils 151 and 155 of the electromagnetic valves 149 and 153 are adapted to act in 180° out of phase relationship with each other. For example, when the contact 115 are made upon energization of the slip relay 111, the electromagnetic coils 143 and 151 are energized so that the electromagnetic valve 141 is opened while the electromagnetic valve 149 is closed.

The electromagnetic valves 149 and 153 are provided for the purpose of exhausting the compressed air existing in the cylinders as described above, and orifices 157 and 159 are provided for the purpose of changing the time constant of the air exhaustion.

Compressed air is passed to the electromagnetic valves 141 and 145 from auxiliary air tanks 161 and 163 to which compressed air is supplied from a compressed air source through orifices 165 and 167, respectively.

If an output is provided by the aforementioned magnetic amplifier $MA_1$, then it is imparted to the gate electrode of the thyristor 107 through diode $D_3$. Upon conduction of the thyristor 107, the slip relay 111 is energized so that the contact 115 thereof is made.

When the contact 115 is thus made, the electromagnetic coils 143 and 151 are energized by auxiliary power source so that the electromagnetic valve 149 is closed while the electromagnetic valve 141 is opened.

Upon opening of the electromagnetic valve 141, the compressed air in the auxiliary air tank 161 is passed to nonreturn valve 137. Generally, under such conditions that a slip is caused, there is no compressed air from the normal brakes. Thus, the compressed air from the auxiliary air tank 161 is supplied to the brake cylinders 121, 123, 125 and 127 through the nonreturn valve 137.

Consequently, braking force is imparted to all the wheels associated with the trucks. In this case, by distributing the compressed air to the brake cylinders 121, 123 or 125, 127 in accordance with the slipping axle, the tractive effort of the adhered axle can effectively be utilized. However, this is not the usual practice because of the complexity of the devices which are to be added for achieving the intended purpose.

Sharp buildup of the braking effort is realized with the aid of the compressed air from the auxiliary air tank 161. Thereafter, the compressed air from the compressed air source is supplied to the respective cylinders through the orifice 165. Thus, subsequent to the sharp buildup, the braking effort is gradually increased, so that it is possible to provide a braking effort corresponding to the slip velocity depending upon the period of time during which the output from the magnetic amplifier $MA_1$ is present.

Upon cessation of a slip, the output of the magnetic amplifier $MA_1$ disappears. As exhaust result, the contact 115 is broken so that the electromagnetic coils 143 and 151 are deenergized.

At this point, the degree of relief of the braking effort can be controlled by adjusting the opening degree of the orifice 157.

With the foregoing slip restraining air brake device, since the buildup of the brake force is sharp, it is possible to restrain a slip during the time when the slip velocity is still very low, by combining the same with quick-response to a slip detecting means such as described hereinabove.

In the foregoing, description has been made of one embodiment of the present invention and an example of applications thereof. The present invention will now be described with respect to several modifications.

The arrangement described above is designed so that individually detected armature voltages are compared in the magnetic amplifiers thereby to obtain a voltage proportional to the slip velocity.

With such arrangement, it is possible to detect a slip by comparing the armature voltages of any selected two main electric motors, irrespective of the arrangement of the main circuit.

In the case of an arrangement wherein the main electric motors are connected in series with each other, the detection of the difference between two armature voltages, i.e., a voltage proportional to such change as shown in FIG. 1(a) can be further facilitated by suitably designing the main electric motor circuit.

Figure 6:
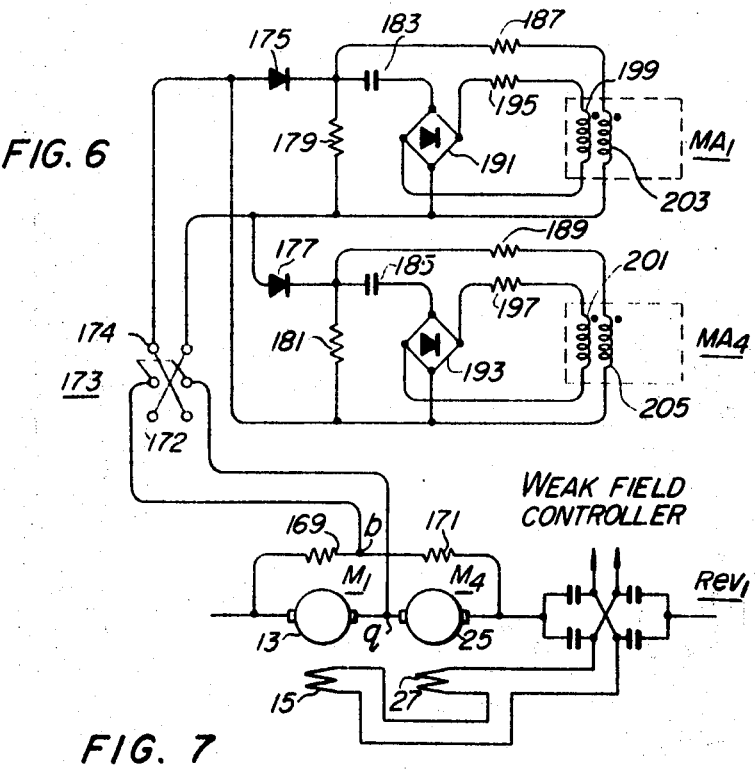
FIG. 6 is a view showing a second embodiment of the present invention.

In FIG. 6, main electric motors $M_1$ and $M_4$ and reversing device $Rev_1$ are similar to those of FIG. 2. The remaining portions are omitted.

Connected in parallel with a series circuit of armatures 13 and 25 are resistors 169 and 171 each having a high resistance value and which are adapted to constitute a balanced bridge including an electromotive force when the voltages of the armatures 14 and 25 are equal to each other.

A switch 173 is changed over in accordance with powering and braking. More specifically, this switch is adapted so that the contacts 174 are engaged during powering or during detection of a slip while during braking or during detection of a skid, the other contact 172 are engaged.

Diodes 175 and 177 are provided for the purpose of distributing a potential appearing between $p$ and $q$ of the aforementioned balanced bridge to the magnetic amplifier $MA_1$ or $MA_4$ according to the polarity thereof.

The aforementioned difference voltage appearing across the resistors 179 or 181 is differentiated by capacitors 183 or 185 and then applied to the control input windings 199 or 201 of the magnetic amplifiers through the resistors 195 or 197. In this case, use is made of diode bridges 191 or 193 in order to obtain the absolute value of the differentiated voltage.

Further, the aforementioned difference voltage is applied also to the other control input windings 203 or 205 through resistors 187 or 189 respectively.

In both of the magnetic amplifiers, the two control input windings 199, 203 and 199, 203 are wound in the same polarity, so that the control input flux produced in each of them becomes equal to the sum of one proportional to the slip velocity and the differential thereof.

Each of these magnetic amplifiers also comprises a bias winding, feedback winding, output windings, etc. as in the case of FIG. 3 and which is adapted to represent such characteristics that sharp buildup is achieved with respect to the positive region of a control input by means of a high positive feedback.

Assume that, in the illustrated arrangement, the switch 173 has its contact 174 engaged, and that the main electric motor $M_1$ is slipping. Then, the voltage at the armature 13 becomes higher than that at the armature 25 so that the balance between $p$ and $q$ is destroyed. Thus, a higher voltage than that at the point $q$ appears at the point $p$.

This voltage difference acts in the forward direction with respect to the diode 175 and in the backward with respect to the diode 177. Thus, a voltage corresponding to the potential difference appearing between the points $p$ and $q$ is obtained across the resistor 179.

The voltage across the resistor 179 energizes the control input winding 203 through the resistor 187, and at the same time it is differentiated by the capacitor 183 and then rectified by the rectifier bridge 191 so that the absolute value of the differentiated voltage is applied to energized the control input winding 199 through the resistor 195.

Consequently, the magnetic amplifier $MA_1$ is energized in the positive region by these control inputs so as to provide an output by which the occurrence of a slip is detected. The output of the magnetic amplifier $MA_1$ is employed for various types of control, as in the foregoing embodiment.

Upon occurrence of a slip at the main electric motor $M_4$, the potential at the point $q$ becomes higher than that at the point $p$ so that the diode 177 is rendered conductive. Thus, by virtue of an action similar to that described above, the magnetic amplifier $MA_4$ is enabled to provide an output.

In the case of a skid, the manner in which the armature voltages are produced is the complete reversal of that in the case of a slip. That is, the armature voltage of a main electric motor which is skidding becomes lower than that of a main electric motor which is slipping so that the potential difference assumes a polarity opposite to that occurring in the case of a slip. Thus, it is required that the polarity be changed by throwing the switch 173 onto the contact 172 side.

Considering the fact that a slip tends to occur during powering while during braking a skid tends to occur, it will be appreciated that the switch 173 may be constituted by contacts adapted for interlocking with the existing changeover means of powering and braking conventionally provided in a vehicle.

With the embodiment shown in FIG. 6, the number of magnetic amplifiers remains the same as in the case of the aforementioned embodiment, but the structure of each part can be simplified. That is, in the embodiment shown in FIG. 6, the magnetic amplifiers may include only two control input windings, although in the first embodiment, the magnetic amplifiers provided therein comprise four control input windings.

Furthermore, in the main circuit, a balanced bridge may be provided for each two main electric motors which are connected in series with each other, as shown in the drawing. Thus, this arrangement may be effectively applied in the case where the number of the series-connected main electric motors is even.

Both of the two embodiments shown in FIGS. 3, 4 and 6 are adapted to detect which axle is slipping.

In actuality, however, it is generally more than enough to determine which axle is slipping except in the cases where slip restraining means is required to detect slipping axles thereby to take effective measures for each of the main electric motors driving the axles as in the cases where control is effected to achieve re-adhesion by reducing the tractive effort of such axles by short-circuiting the field windings of the corresponding main electric motors.

The reason is that the design is made such that a braking effort is imparted not only to the axles which are slipping but to all the axles including the slipping axles that are associated with the trucks, as will also be seen from the slip restraining airbrake means shown in FIG. 5.

In the case of an electric vehicle having such main circuit arrangement as shown in FIG. 2, such control as to stop the phase-control of the converter means 11 or return the control angle to the original value is effected simultaneously with the detection of a slip. This has effect on all the driving axles.

Therefore, the following modification may be considered.

Figure 7:
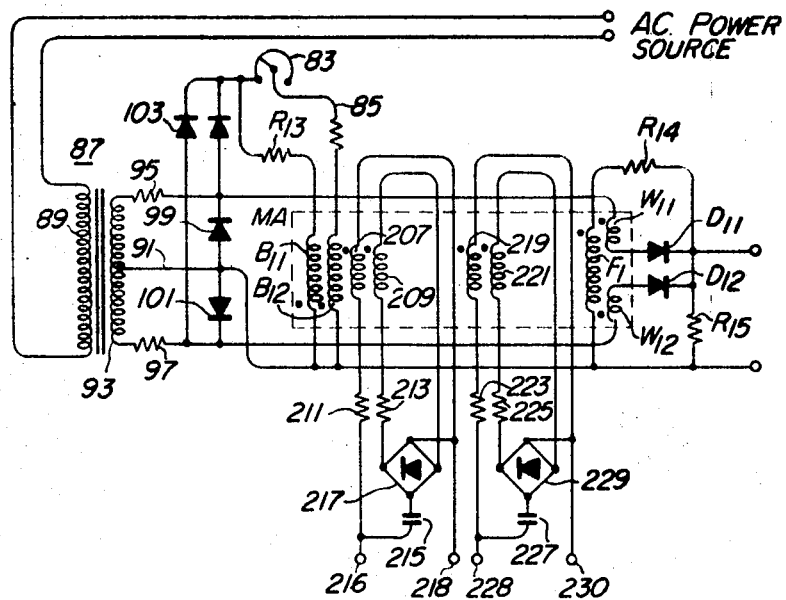
FIG. 7 is a view showing a third embodiment of the present invention.

In FIG. 7, the power source portion of a magnetic amplifier MA is completely the same as the power source shown in FIG. 4. Further, the magnetic amplifier MA per se is similar to the magnetic amplifier $MA_1$ shown in FIG. 4 except for the inclusion of control input windings 207, 209 and 219, 221.

The control input winding 207 is energized through a resistor 211 by a voltage applied across terminals 216 and 218. This voltage is differentiated by a capacitor 215, rectified by a diode bridge 217, and then applied to energize the control input winding 209 through a resistor 213.

The control input winding 219 is energized through a resistor 223 by a voltage applied across terminals 228 and 230. This voltage is also differentiated by a capacitor 227, rectified by a diode bridge 229 and then applied to energize the control input winding 211 through a resistor 225.

The voltages applied across the terminals 216 and 218 and across the terminals 228 and 230 correspond to the voltage appearing between the point $p$ and $q$ of the balanced bridge shown in FIG. 6. That is, these voltages correspond to the differences between the armature voltages of the main electric motors $M_1$, $M_4$ and $M_2$, $M_3$ respectively.

The control input windings 207, 209, 219 and 221 are wound in the same polarity, so that the respective voltages and the values of their differentials are added to each other. In this case, the number of control input windings is optional. That is, if more combinations of balanced bridges are possible, then corresponding control input windings may be provided in a manner similar to the above.

With the foregoing arrangement, it is possible to produce the following various controlling actions.

By setting the magnetic amplifier MA with the aid of the variable resistor 83 to such a level that it is made responsive even when a pair of control inputs, e.g., the control input windings 107 and 109 are energized, an output voltage across a resistor $R_{15}$ is varied in accordance with the number of control inputs. In this case, however, the positive feedback provided by the feedback winding $F_1$ should not be made too strong.

Thus, it is possible to obtain a slip detection output corresponding to the number of slipping axles. As a result, it is possible to take an effective slip restraining measure corresponding to the number of slipping axles.

Further, by setting the magnetic amplifier MA with the aid of the variable resistor 83 to such a level that it is made responsive only when two control inputs are applied thereto, no slip detection output is provided when only one axle is slipping.

This is effective in the cases where there are so many driving axles that even if only one axle is slipping it is expected that the vehicle can be surely accelerated by the remaining axles so as to be subjected to re-adhesion.

In the embodiment just described, the magnetic amplifier may include only the necessary number of control input windings, and only one such magnetic amplifier is provided. Thus, the structure can be greatly simplified.

By designing the main circuit so that a voltage proportional to the slip velocity is detected directly from some of the main electric motors, only a pair of control input windings such for example as 207 and 209 are enough for the magnetic amplifier shown in FIG. 7 so that the construction of the slip detecting means can be greatly simplified.

Description will now be made of several examples each of which may be constituted by the use of diodes and resistors, if necessary, so as to be simplified in construction.

Figure 8:
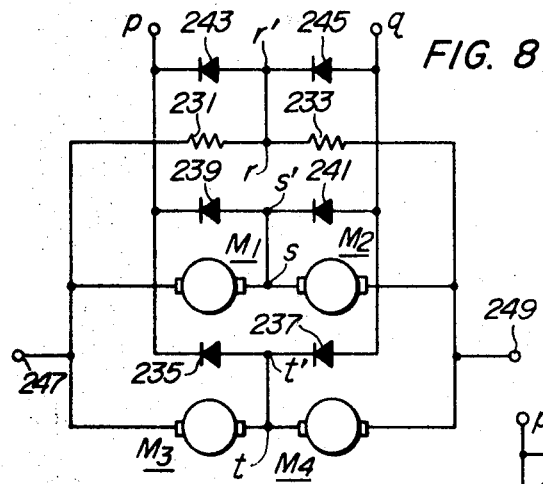
FIGS. 8, 9 and 10 are views showing examples of means for detecting a quantity of electricity proportional to a difference between axle velocities, which may be applied to another embodiment of the present invention.

FIG. 8 shows a main circuit wherein four main electric motors are connected in series parallel with each other. In this FIG., only the armatures of the main electric motors $M_1$, $M_2$, $M_3$, $M_4$ are shown, with the field windings and other elements being omitted.

A series circuit of two resistors 231 and 233 having an equal value is connected in parallel with the armature circuit.

There are provided six diodes each two of which are connected in series with each other, and these series circuits are connected in the same direction in parallel with each other. In each of the series connections, the cathodes of the diodes are connected with the terminal $p$, and the anodes thereof are connected with the terminal $q$.

The connection point $r$ between the resistors 231 and 233 and the connection points $s$ and $t$ where the respective armatures are connected in series with each other are coupled to the connection points $r'$, $s'$ and $t'$ where the respective diodes are connected in series with each other, respectively.

In order to achieve speed control with respect to the main electric motors $M_1$, $M_2$, $M_3$ and $M_4$, a controlled variable voltage is applied to terminals 247 and 249.

Upon application of the voltage to the terminals 247 and 249, the connection point $r$ between the resistors 231 and 233 is maintained at a potential which is half the applied voltage because of the fact that these resistors have an equal value.

Also, the connection points $s$ and $t$ between the armatures are maintained at a potential which is half the applied voltage and this is substantially equal to the potential at the point $r$ when the main electric motors $M_1$, $M_2$, $M_3$ and $M_4$ are normally powering without slipping.

Thus, none of the diodes is rendered conductive since the potentials at the connection points $r'$, $s'$, and $t'$ between the diodes are substantially equal to each other.

If it is assumed that the main electric motor $M_1$ is slipping, then the armature voltage thereof increases while the armature voltage of the main electric motor $M_2$ decreases. That is, the potential at the point $s$ becomes lower than those at the points $r$ and $t$.

As a result, the terminal $p$ assumes the higher one of the potentials at the points $r$ and $t$ and the terminal $q$ assumes the potential at the point $s$. Thus, by connecting a load between the terminals $p$ and $q$ a voltage corresponding to the potential difference between the terminals $p$ and $q$ is developed across the load.

In this way, if the main electric motor $M_3$ is in adhesion, the potential difference appearing between the terminals $p$ and $q$, represents an increment of the armature voltage of the main electric motor $M_1$ corresponding to the slip velocity, since the armature voltage of the main electric motor $M_3$ is equal to the voltage across the resistor 231.

When the two main electric motors $M_1$ and $M_3$ are slipping, the difference between that armature voltage which corresponds to the higher slip velocity and the voltage across the resistor 231 appears between the terminals $p$ and $q$.

The potential difference appearing between the terminals $p$ and $q$ has the polarity changed according to whether the main electric motors $M_1$, $M_3$ or $M_2$, $M_4$ are slipping or skidding, as is the case with the potential difference appearing between the terminals $p$ and $q$ in FIG. 6. Therefore, it is necessary to provide a switch 173 which is adapted to be changed over between the slip detection and the skid detection as shown in FIG. 6.

In the foregoing arrangement, detection is made of a voltage proportional to the highest slip velocity of the four main electric motors by comparing the potentials at the connection points $s$ and $t$ between the series-connected main electric motors with a reference potential which occurs during normal powering. Resistors 207 and 209 are provided for the purpose of providing such reference potential.

Figure 9:
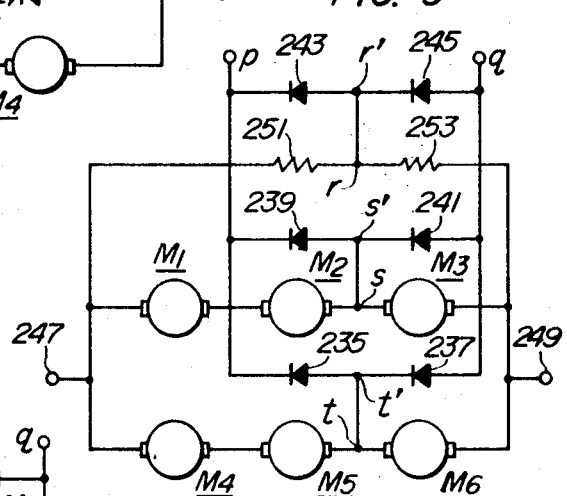

Therefore, some care should be taken in the provisions of the reference voltage in the case of the arrangement such as shown in FIG. 9 wherein three main electric motors are connected in series with each other.

In the case of this arrangement a potential which is one-third of the voltage applied across terminals 247 and 249 is maintained at the series connection points $s$ and $t$ between the armatures during normal powering. Therefore, the reference voltage should be selected accordingly. In the present embodiment, the potential at the point $r$ is made to be equal to those at the points $s$ and $t$ by selecting the values for resistors 251 and 253 so that the ratio of the former to the latter becomes 2:1.

This arrangement is similar to that shown in FIG. 8 in respect of the operation when one or more main electric motors are slipping.

Figure 10:
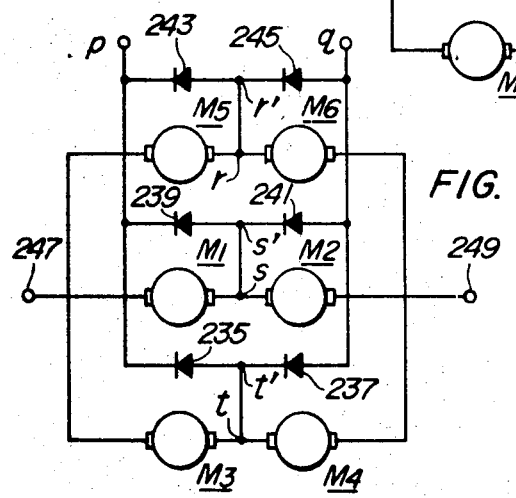

In the case where the number of parallel connections between the main electric motor circuits is increased as shown in FIG. 10, it is very unlikely that simultaneous clipping occurs with respect to three parallel connections such for example as the main electric motors $M_1$, $M_3$, $M_5$.

It may be considered therefore that either one of the three connection points $r$, $s$ and $t$ is always maintained substantially at the reference voltage. Thus, there is no need to provide any resistors for providing reference voltage.

In FIGS. 8 to 10, if loads are connected between the respective cathodes of the diodes 235, 239, and 243 and the terminal $q$ respectively instead of connecting said cathodes to the load as a group, a voltage which is proportional to the difference between the minimum value in all the armature voltages of the main electric motors and the armature voltage of each main electric motor is developed across the corresponding load. In such case, the minimum armature voltage in all the motors is taken as a reference voltage as mentioned above, and it is considered that the main electric motor which provides the minimum armature voltage is in adhesion.

The present invention has been described and illustrated with respect to the particular embodiments. In order to confirm the effect of the present invention, experimental results obtained by the inventors will be described below.

The vehicle used in the experiment was an electric locomotive provided with six driving axles which are adapted to be driven by six main electric motors respectively.

These six main electric motors were subjected to three-stage changeover control at the starting point. In the first stage, all the main electric motors were connected in series with each other; in the second stage, two circuits each comprising three main electric motors connected in series with each other were connected in parallel with a power source so as to form such a circuit as shown in FIG. 9; and finally in the third stage, three circuits each comprising two main electric motors connected in series with each other were connected in parallel with the power source so as to form such a circuit as shown in FIG. 10.

The voltage applied to the main electric motors was controlled by sequentially short-circuiting main resistors connected in series with the main electric motor circuits in the respective stages described above in accordance with each notch for the control. Transfer of axle weight starting point was not compensated for.

This locomotive ran on flat rails, pulling two vehicles each having a weight of about 64 tons. Air pressure brake of about 3 kg./cm.$^2$ was imparted to the vehicles being pulled. As a result, a running resistance of about 35 tons is imparted to this locomotive. Furthermore, water was sprayed onto the rails in front of the first shaft in order to cause a slip.

The slip detecting means was of the system shown in FIGS. 3 and 4. The slip detection sensitivity was adjusted as follows:
For the slip velocity: 5 km./h.
For the differential value (slip acceleration): 1 km./h./s.

The experiment was performed with respect to two vehicle speeds $V_t$. One of the speeds was the starting speed ($V_t=0$), and the other one was the running speed ($V_t=20$ km./h.).

Figure 12A:
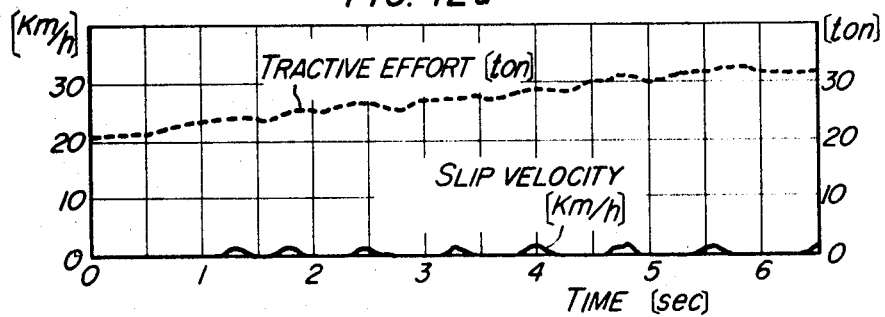
FIGS. 12a and 12b show measured oscillograms obtained when the apparatus according to the present invention was applied.
Figure 12B:
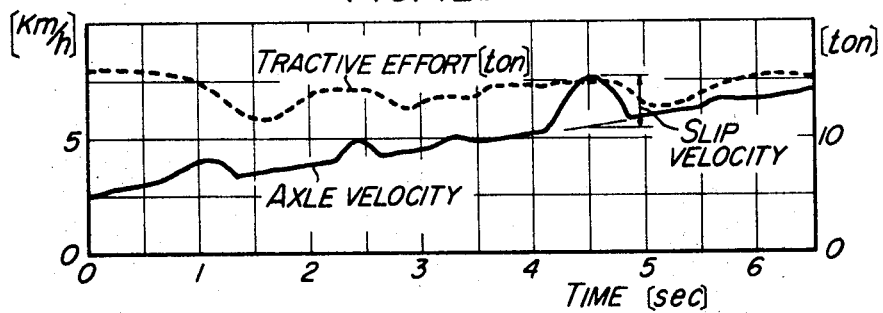

As the re-adhesion system, use was made of a system wherein the notching is stopped and the air brake is imparted subsequent to the detection of a slip and a system wherein the notch is returned to the original position. FIGS. 12(a) and 12(b) shows oscillograms measured in the former system.

Figure 11:
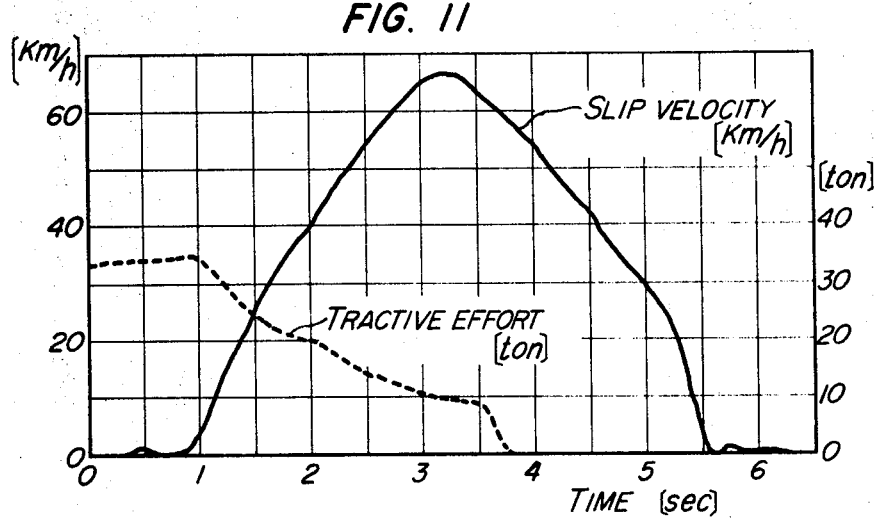
FIG. 11 shows a measured oscillogram illustrating a slip phenomenon which occurred when the apparatus according to the present invention was not applied.

FIG. 11 shows and oscillogram measured in the case where use was made of no means for restraining a slip, from which it will be seen that a slip velocity as high as 67 km./h. was reached in about 2.5 seconds after the slip started. In the experiment, the main electric motor circuits had to be disconnected from the power source during the operation.

FIG. 12(a) shows the oscillogram obtained at the starting point ($V_t \times 0$). In this Figure, the solid line indicates variations in the slip velocity, and the dotted line indicates variations in the tractive effort. As ) be seen from this Figure, the slip velocity was restricted to about 1–2 km./h. and the tractive effort increased without fail, although it slightly decreased immediately after the slip occurred.

FIG. 12(b) shows the oscillogram obtained during the powering. In this Figure, the solid line indicates the axle velocity. In this case, the running speed was only 2.5 km./h. even in the case of the greatest slip. The tractive effort was 14.8 tons prior to the occurrence of the slip, and the average tractive effort during repetition of slipping and re-adhesion was 13.5 tons with reduction of only 9 percent.

The slip velocity and vehicle speeds in FIGS. 11 and 12 were measured with the aid of DC tachogenerators associated with the respective axles of the locomotive.

What is claimed is:

1. The re-adhesion apparatus for a vehicle having at least one drive axle normally adhesively coupled with a drive surface and at least one other axle for coupling said vehicle with said drive surface, comprising:

first means, coupled to said axles, for detecting the velocity between said drive surface and at least one of said axles, which has become nonadhesively coupled with said drive surface and providing a first signal representative of said velocity;

second means, coupled with said drive surface, for detecting the speed of said vehicle and providing a second signal representative of said speed;

third means responsive to said first and second means, for generating a third signal representative of the difference between said first and second signal;

fourth means, responsive to said third means, for producing a fourth signal representative of the time derivative of said third signal;

fifth means, responsive to said third and fourth means, for generating a fifth signal representative of the sum of said third and fourth signals; and sixth means, responsive to said fifth means, for generating an output when said fifth signal exceeds a predetermined level.

2. An apparatus in accordance with claim 1, wherein said second means includes said at least one other axle which is adhesively coupled with said drive surface.

3. An apparatus in accordance with claim 1, wherein said fourth means includes means for generating a modified fourth signal proportional to the absolute value of said fourth signal and wherein said fifth means is responsive to said modified fourth absolute value signal.

4. An apparatus in accordance with claim 1, wherein said vehicle has a pair of axles and wherein said second means is responsive to the velocities of said pair of axles for providing a respective pair of signals inverted with respect to each other and indicative of the velocities of said axles and further including a first relay, responsive to said means for generating said pairs of signals, for providing said second signal when said pair of signals reach a preset level.

5. An apparatus in accordance with claim 1, wherein said vehicle has a pair of axles and wherein said fourth means is responsive to the velocities of said pair of axles for providing a respective pair of differential signals inverted with respect to each other and indicative of the velocities of said axles and further including a second relay, responsive to said means for generating said pairs of signals, for providing said fourth signal when said pair of signals reach a preset level.

6. An apparatus in accordance with claim 1, wherein said vehicle has a pair of additional axles, and wherein said third means includes means for detecting the difference between the velocities of said pair of additional axles and for generating a signal indicative thereof, and further including a third relay, responsive to said additional axle velocity difference signal, for providing said third signal, when said difference signal reaches a preset level.

7. An apparatus in accordance with claim 6, wherein said third means further includes a bridge circuit for receiving pairs of signals from said additional axles for balancing said signals thereacross to provide said difference signal.

8. An apparatus in accordance with claim 1, wherein said vehicle has a pair of additional axles, and wherein said fourth means includes means for detecting the difference between the velocities of said pairs of additional axles and for generating a signal indicative thereof, and further including a fourth relay, responsive to said additional axle velocity difference signal, for providing said fourth signal when said difference signal reaches a preset level.

9. An apparatus in accordance with claim 1, wherein said sixth means includes a relay circuit responsive to a predetermined level of said fifth signal for generating said output.

10. An apparatus in accordance with claim 1, wherein said vehicle further includes a plurality of axles, which are normally adhesively coupled with said drive surface, and wherein said first means includes means for detecting the velocities between said drive surface and at least two of said axles, which have become nonadhesively coupled with said drive surface to provide a first set of signals representative of said velocities.

11. An apparatus in accordance with claim 10, wherein said third means includes means for providing a deviation signal representative of the greatest difference between said second signal a and a signal produced by said first means to provide said third signal.

12. An apparatus in accordance with claim 1, wherein said vehicle further includes an electric motor coupled with at least the one of said axles which has become nonadhesively coupled with said drive surface for applying a mechanical force to said axle, and further includes seventh means, responsive to the output of said sixth means, for decreasing the mechanical force applied to said axle.

13. An apparatus in accordance with claim 12, wherein each of said axles includes an electric motor coupled therewith, each motor having an armature portion, and wherein said first and second means include means for generating said first and second signals in response to the magnitude of the respective armature voltages.

14. An apparatus in accordance with claim 13, wherein said seventh means includes means for retarding the buildup of the armature voltages across the motor coupled to said nonadhesively coupled axle.

15. An apparatus in accordance with claim 13, wherein each of said motors includes a field winding, and wherein said seventh means includes means for reducing the field current flowing through the motor coupled to said nonadhesively coupled axle.

16. An apparatus in accordance with claim 1, wherein said vehicle further includes an air brake coupled with at least the one of said axles which has become nonadhesively coupled with said drive surface for applying a braking force to said axle and further includes brake means, responsive to the output of said sixth means, for imparting a braking force to said axle.

17. An apparatus in accordance with claim 16, wherein said airbrake includes a brake cylinder and a source of compressed air therefore, including an auxiliary air tank communicating with said cylinder through an air supplying surface, for supplying brake imparting air pressure to said brake in response to said output signal.

18. An apparatus in accordance with claim 16, wherein said brake means includes means for detecting the output of said sixth means, for decreasing the amount of braking force applied to said axle, so as to reduce and stop nonadhesive skidding.

19. An apparatus in accordance with claim 18, further including a brake cylinder and an adjusting valve, associated with said airbrake, and responsive to said sixth means, for exhausting compressed air from said brake cylinder, and wherein said sixth means includes means, coupled with said adjusting valve, for varying the operation thereof in response to said output signal.

20. A re-adhesion apparatus according to claim 9, wherein said vehicle further includes a pair of sets of electric motors, each including an armature and a field winding, for driving the vehicle axles, the armatures of said motors being connected to said third means, each including a pair of magnetic amplifiers, each of which having a pair of windings, therein, the polarities of the windings of each magnetic amplifier in said third means associated with each motor being of a polarity opposite the polarity of the windings in the other magnetic amplifier in each of said third means.

21. A re-adhesion apparatus according to claim 20, further including a capacitor and a full-wave rectifier connected in series with one of the windings of each magnetic amplifier in said pair of magnetic amplifiers to provide a signal representative of the absolute value of the differential of the slip velocity, said capacitor and full-wave rectifier being connected in parallel with the other of the windings of each of said magnetic amplifiers in said pair of magnetic amplifiers, so as to deliver to each respective armature a signal representative of said fifth signal 22. A re-adhesion apparatus according to claim 21, wherein each magnetic amplifier is is provided with a pair of bias windings connected to an adjustable power source for individually varying the characteristics and detection sensitivity thereof, and further including feedback windings to impart positive feedback thereto so as to provide said magnetic amplifiers with the desired switching characteristics of a relay, and further including a pair of output windings associated with each magnetic amplifier, wherein the outputs of said output windings are connected through respective rectifiers to a pair of slip relays for controlling said vehicle system.

23. A re-adhesion system according to claim 22, further including a pair of thyristors connected to said slip relays and the power source for said magnetic amplifiers, the control electrodes of said thyristors being activated by the outputs of said respective rectifiers.

24. A re-adhesion apparatus according to claim 9 wherein said vehicle comprises a pair of sets of electric motors, each including an armature and a field winding, for driving the vehicle axles, the armatures of each of said motors being connected to said third means, each including a pair of magnetic amplifiers, and wherein pairs of armatures form adjacent arms of a bridge circuit, the other adjacent arms of the bridge circuit being formed by a pair of resistances, the connection points between the elements of adjacent arms being connected to a reversing switch for connecting said third means according to the polarity desired across said bridge, depending upon whether said vehicle is being powered or braked.

25. A re-adhesion system according to claim 9, wherein said vehicle further comprises a pair of sets of electric motors, each including an armature and a field winding for driving the vehicle axles, the armatures of each of said motors being connected to said third means, each including a magnetic amplifier having a pair of windings therein, and being provided with a pair of bias windings connected to an adjustable power source for individually varying the characteristics and detection sensitivity thereof and further having a feedback winding connected magnetically in parallel therewith to impart positive feedback thereto, so as to provide said magnetic amplifier with desired switching characteristics and also having a pair of output windings, connected magnetically in parallel with said feedback winding, and wherein each magnetic amplifier includes a pair of control winding sets, one of the windings in each set being connected in series with a capacitor and a full-wave rectifier to provide a signal representative of said fourth signal indicative of the absolute value of the differential of the slip velocity associated with said set, said capacitor and said full-wave rectifier being connected in parallel with the other winding of said set, so as to deliver to each respective armature a signal representative of said fifth signal.